United States Patent [19]

Merz

[11] 4,163,208
[45] Jul. 31, 1979

[54] AUTOMATIC WIRELESS TIRE PRESSURE MONITORING SYSTEM

[76] Inventor: Ernest J. Merz, 745 Old State Rd., Berwyn, Pa. 19312

[21] Appl. No.: 825,177

[22] Filed: Aug. 16, 1977

Related U.S. Application Data

[63] Continuation-in-part of Ser. No. 641,817, Dec. 18, 1975.

[51] Int. Cl.² ............................................. B60C 23/04
[52] U.S. Cl. ..................................... 340/58; 73/146.5; 73/146.8; 200/61.25
[58] Field of Search ............ 340/58; 200/61.22, 61.25; 73/146.3, 146.5, 146.8

[56] References Cited

U.S. PATENT DOCUMENTS

| | | | |
|---|---|---|---|
| 2,057,556 | 10/1936 | Cole | 340/58 |
| 2,629,086 | 2/1958 | Ainsworth | 340/58 |
| 2,727,221 | 12/1955 | Sprigg | 340/58 |
| 3,016,515 | 1/1962 | Summers et al. | 340/58 |
| 3,111,644 | 11/1963 | Froelich et al. | 340/58 |
| 3,178,686 | 4/1965 | Mills | 340/58 |
| 3,329,934 | 7/1967 | Wooden | 340/58 |
| 3,588,815 | 6/1971 | Koonce | 340/58 |
| 3,638,180 | 1/1972 | Lejeune | 340/58 |
| 3,694,803 | 9/1972 | Strenglein | 340/58 |
| 3,786,413 | 1/1974 | Ross et al. | 340/58 |
| 3,828,309 | 8/1974 | Yamasaki et al. | 340/58 |
| 3,832,681 | 8/1974 | Kaida et al. | 340/58 |
| 4,048,614 | 9/1977 | Shumway | 340/58 |
| 4,075,603 | 2/1978 | Snyder et al. | 340/58 |

Primary Examiner—John W. Caldwell, Sr.
Assistant Examiner—Joseph E. Nowicki
Attorney, Agent, or Firm—Woodcock, Washburn, Kurtz & Mackiewicz

[57] ABSTRACT

A tire pressure sensor is connected to a radio frequency transmitter which transmits signals to the operator station representing the condition of the vehicle's tires. The transmitter receives its power from an electromagnetic coil energized by rotation of the vehicle's wheel. In one embodiment, the coil is mounted on the vehicle's wheel and a magnet is mounted on the chassis so that rotation of the wheel energizes the RF transmitter.

14 Claims, 12 Drawing Figures

ROTATIONAL INTERFACE

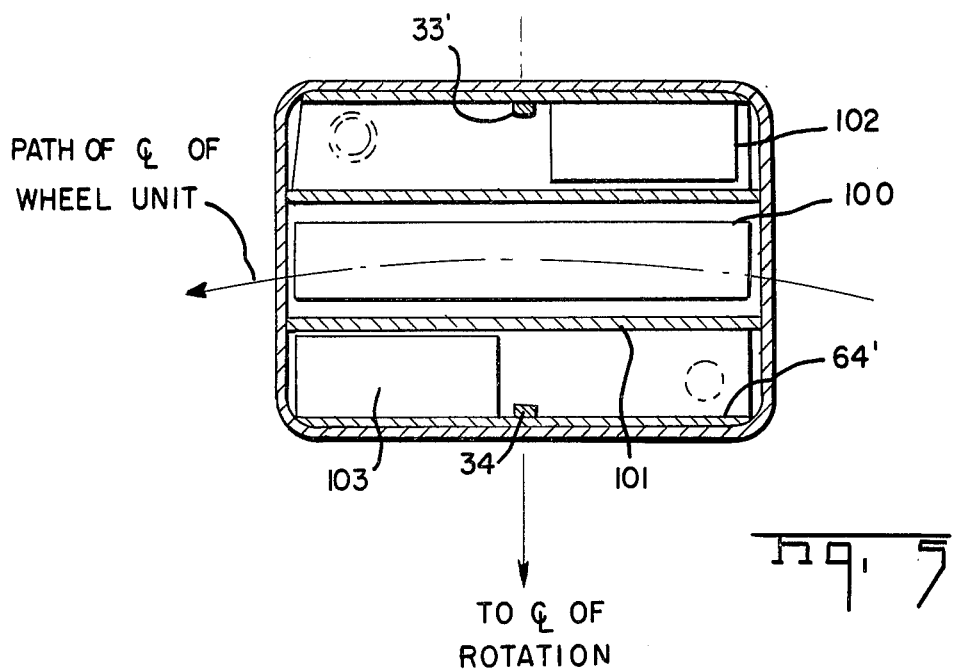
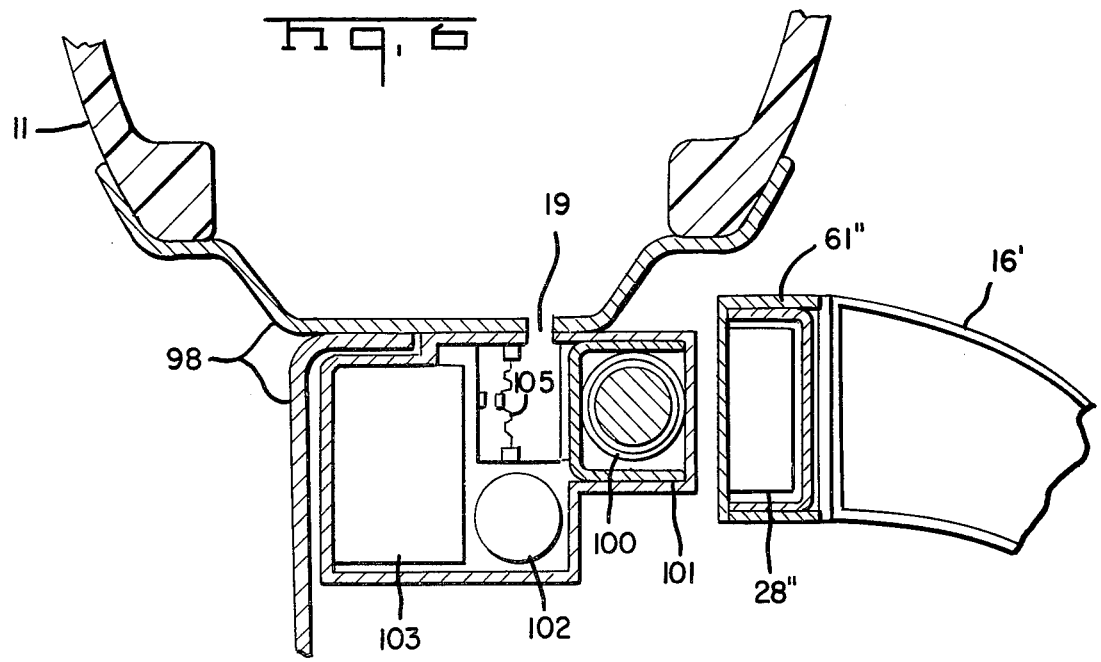

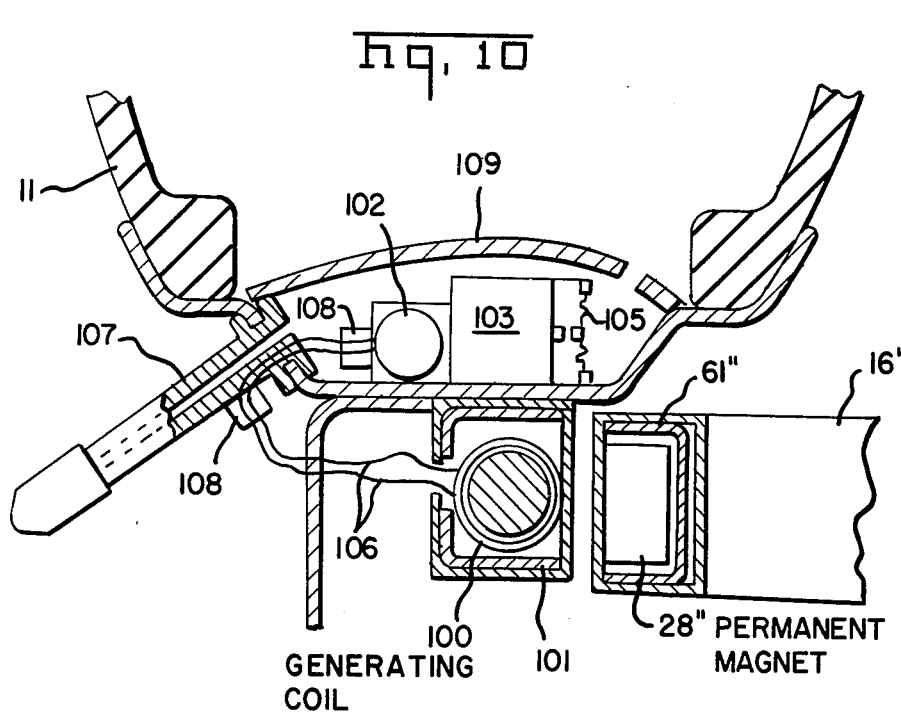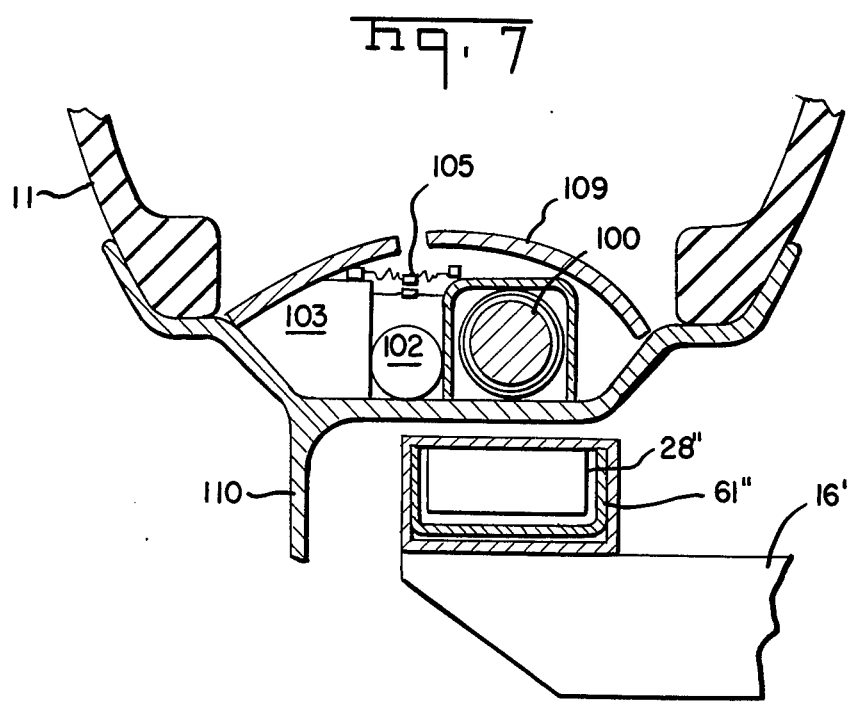

AUTOMATIC WIRELESS TIRE PRESSURE MONITORING SYSTEM

This application is a continuation-in-part of application Ser. No. 641,817, filed Dec. 18, 1975.

BACKGROUND OF THE INVENTION

This invention provides a system for monitoring the condition of a device such as a pneumatic tire mounted on a rotating axis and providing indications of both satisfactory and unsatisfactory conditions at the operator's control station. In a pneumatic tire/vehicle system, it will respond to both excessive high tire pressure and dangerously low pressure to provide a warning signal to the vehicle operator, and will respond to a range of satisfactory pressures by providing an indication of satisfactory condition to the vehicle operator.

The value of maintaining proper inflation pressure in vehicle pneumatic tires has been demonstrated both in vehicle safety and in minimizing tire wear. Warning systems in the prior art have frequently addressed themselves to providing a signal only in case of low tire pressure and do not respond to excessive high pressure to indicate an unsatisfactory signal. Such systems are shown in Yamasaki—U.S. Pat. No. 3,828,309 and Kaida—U.S. Pat. No. 3,832,681. Excessive high pressure is also dangerous, particularly when one tire of a pair has excessive pressure, and it also leads to uneven tread wear and economic loss. In previous systems for indicating both high and low pressures, such as Ainsworth—U.S. Pat. No. 2,629,086, double air pressure chambers have been used leading to great complexity and fabrication cost.

Prior art tire pressure systems usually have wires connecting the pressure sensor to an indicator at the operator's station. Wiring is expensive to install and subject to failure in the hostile environment of a moving vehicle. Attempts to provide wireless transmitters of tire pressure signals have not been completely successful. Such transmitters require batteries which are subject to failure or they must be wired to a power source.

Koonce—U.S. Pat. No. 3,588,815 and Mills—U.S. Pat. No. 3,178,686 are examples of prior art which use expendable batteries mounted on the rotating wheels. The batteries not only introduce space, weight and location limitations but also create a maintenance problem in checking or replacing the batteries at regular intervals. Additionally, the need for indicating a satisfactory pressure at the beginning of each trip or on operator command in order to be assured of proper operation of the monitoring system will lead to rapid depletion of the batteries. Another method of supplying power in prior art, Ross—U.S. Pat. No. 3,786,413, has been the use of mechanical devices dependent on dynamic forces to generate electric current on each wheel for transmission of RF signals therefrom. Still another prior art, Streglein—U.S. Pat. No. 3,694,803, has depended on the use of a passive transducer element powered by a space-transmitted radio frequency. Most prior art has required the attachment of an air hose or tube either directly to the pressurized cavity by means of a hole through the rim or to the valve stem of the wheel and thereby to the pressurized cavity. Experience has shown that the potential for air leakage is increased directly with the number of openings into the air cavity or valve stem. Therefore, a monitoring system which will not require the addition of openings will be most reliable with respect to possible loss of air pressure.

A typical pneumatic tire is designed to be inflated to a given pressure when cold and to operate satisfactorily at a higher pressure when the tire and the air it contains are heated by normal road operation. Hence, a range of satisfactory pressures must be accommodated in order for a pressure monitoring system to have maximum flexibility. When the pressure rises above or falls below that range, it should immediately provide an indication of malfunction and the type of malfunction (high or low) to the vehicle operator.

Many situations such as the checkout of an aircraft before flight require a positive signal that the tire condition is normal as well as a warning signal that the condition is abnormal. This ensures that a failure in the monitoring system such as a lack of warning cannot be misconstrued as an indication of system readiness. Therefore, it is most effective to provide a positive signal to the vehicle operator so that the driver of a truck, for instance, may be assured of the tire condition before leaving the freight terminal and proceeding onto a highway. The driver of a large truck often cannot determine the condition of his tires by the reaction of the vehicle and may proceed to the point where a soft tire becomes overheated and is completely destroyed. Similarly, on dual wheels, the other tire installed with a malfunctioning tire may be overloaded and destroyed. This economic loss is a significant part of tire expense and may be alleviated by an adequate warning system. If a front tire on a truck is operated at low pressure and a blowout occurs, the consequent loss of control may lead to a very serious accident and loss of life, particularly on a busy high speed highway.

Certain other systems, such as in the Lejeune U.S. Pat. No. 3,638,180, use a manually reset mechanism to indicate an abnormal condition. The system of the Kaida U.S. Pat. No. 3,832,681, uses a mechanism operated by centrifugal force and therefore is dependent on vehicle speed for successful operation. To reduce labor and the possibility of human error, the monitoring system should be completely automatic, and immediately reversible with only the pneumatic pressure as an input. It should operate reliably and consistently from a speed of a few miles per hour up to the top speed at which the vehicle is to operate. Other systems, such as in Yamasaki U.S. Pat. No. 3,828,309, do not account for the centrifugal forces which will be present in a rapidly rotating body since they utilize actuators operating in a radial direction with respect to the axis of rotation. The centrifugal force on a one pound object six inches from the center of the wheel of a passenger car traveling at 60 mph is over 100 pounds. These forces and the friction that they cause must be accounted for in order to provide a reliable indication independent of vehicle speed. Hence, all operating mechanisms should be dynamically balanced and should provide enough operating force to overcome friction inherent in a rapidly rotating body.

Most systems utilizing a magnetic field projected from the rotating wheel to a sensor on the vehicle chassis have not accounted for the influence of nearby ferrous materials on the magnetic field. Almost all vehicles use large quantities of steel and iron for the wheels, tire rims, brake drums, wheel hubs, axles, brakes, springs and other chassis parts. Any of these parts which are near a magnet will tend to distort and divert the magnetic field from its normal condition. Therefore, previous art, such as the magnetic sensors of Ainsworth—U.S. Pat. No. 2,629,086, Cole—U.S. Pat. No. 2,057,556, Lejeune—U.S. Pat. No. 3,638,180, which have not accounted for this type of interference due to the ferromagnetic environment, may have been subject to inaccuracies and variations depending on the specific conditions where they were installed. Other external magnetic influences, although usually quite small, might conceivably influence a magnetic sensor if proper shielding is not provided. In order for a magnetic signal device to be useful and accurate on many different vehicles, means must be provided to shield both the magnetic signal generating unit and the receiving magnetic sensors from the effects of adjacent ferrous components and random magnetic influences.

SUMMARY OF THE INVENTION

By transmitting signals from the tires to the operator's station by means of radio frequency signals, costly wiring is avoided. Because the radio frequency transmitter is powered by rotation of the wheels, the need for batteries or electrical power connections is eliminated.

The use of batteries is subject to failure. Accordingly, it is an object of the present invention to provide a more reliable tire pressure monitoring system.

It is another object of the present invention to provide a tire pressure monitoring system which is easy and inexpensive to install.

It is another object of the present invention to provide a wireless tire pressure monitoring system using all solid state components on the wheel.

It is a further object to provide a tire pressure monitoring system wherein the wheel mounted unit is enclosed entirely within the pressurized tire cavity.

It is a still further object of this invention to provide a tire pressure monitoring system for use on a steel wheel which does not require additional penetrations of the wheel/tire cavity.

It is another object of this invention to provide a wireless tire pressure monitoring system providing signals to the vehicle operator of either excessive high pressure, satisfactory pressure, or dangerous low pressure.

It is a further object of this invention to provide a wireless tire pressure monitoring system providing identification of the wheel being monitored to the vehicle operator.

The foregoing and other objects, features and advantages of the invention will be better understood from the following more detailed description and appended claims.

DESCRIPTION OF THE DRAWINGS

FIG. 5 is a view on the line 5—5 of FIG. 4;

FIG. 6 shows an embodiment of the invention in which the tire pressure sensor, transmitter and electromagnetic generating coil are on the wheel of the vehicle;

FIG. 7 shows an embodiment in which the pressure switch, transmitter and electromagnetic generating coil are within the tire casing;

FIG. 10 shows an embodiment in which the pressure switch and transmitter are inside the tire casing and in which the electromagnetic generating coil is outside of the tire casing;

DESCRIPTION OF THE PREFERRED EMBODIMENTS

The embodiments shown in the figures are explained with their advantages and applications. Other modifications which are too numerous to present may be utilized based on the features discussed and will perform the same functions. The embodiments shown are intended primarily for tire pressure monitoring but may be used for monitoring fluid pressure on any rotating wheel such as a turbine, or for monitoring other conditions or events, as on a helicopter rotor.

Figure 1:
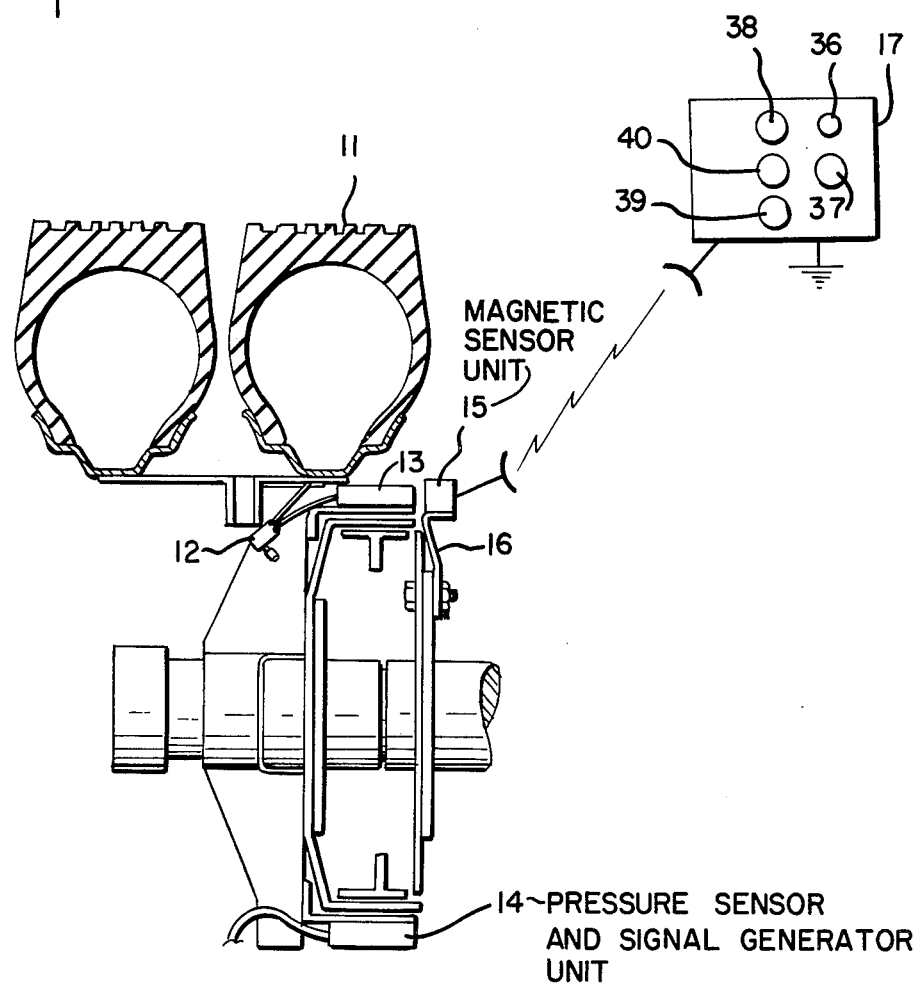
FIG. 1 is a partial sectional and diagrammatic view of a dual wheel type vehicle showing the general location of the key monitoring system components.

The embodiment shown in FIG. 1 is a monitoring system for a vehicle equipped with dual tires as on the rear wheels of large trucks. For the front wheels of such trucks and for other vehicles with single tires, the same apparatus would be used except that only one pressure sensor and signal generator unit per wheel would be necessary. In this case, a balance weight must be attached at the opposite side of the wheel to prevent dynamic imbalance.

The general layout of the system in FIG. 1 shows the tire 11 connected by its regular valve stem to an adapter unit 12 having a secondary valve cap and core valve for use in normal inflation of the tire. The valve core is removed from the regular stem of the inner tube (or tubeless tire stem) so that a direct passage is open from the tire interior to the pressure sensor of the monitoring system. For use with a wheel employing a tubeless tire, as on a passenger vehicle, the adapter unit may be combined with the regular inflation stem for purposes of economy. The adapter unit line going to the pressure sensor may be a flexible hose of typical fabric and rubber construction suitable for the tire pressure involved or may be a metal tube formed to the length and shape suitable for the specific wheel and tire being outfitted.

The pressure sensor and signal generator unit 13 (sometimes referred to as the pressure unit) is shown located on a bracket attached to the vehicle wheel and in the radial space between the tire and the brake drum. If this volume is not available as on some vehicles, the pressure unit may be located within the radius of the brake drum or any other location adjacent to a nonrotating portion of the vehicle which is suitable for mounting the magnetic sensor. Penetration of the brake drum or attachment of the pressure unit directly to the drum should normally be avoided in order to minimize modifications to existing designs and costs attendant thereto. A second pressure unit 14 for the other tire is located on the opposite side (180° away) of the wheel where it balances the first unit. As either unit rotates past the dual magnetic sensor unit on the nonrotating portion of the vehicle, a signal will be generated and relayed to the display unit. It is not important to have two separate magnetic sensor units since isolation of a malfunction to one of two dual tires will provide adequate information for rapid corrective action. The electronic logic will be used to yield a malfunction signal if either of the two pressure units provides a malfunction signal.

The magnetic sensor unit 15 is installed on a bracket 16 attached to the nonrotating portion of the vehicle axle or brake support plate and is adjusted to provide a nominal clearance from the pressure unit. A clearance of ¼ inch is adequate for most vehicles but may be increased to one inch if necessary. A unique mounting bracket may be provided for the pressure unit and for the magnetic sensor for each model vehicle depending on configuration. In this manner, the pressure unit and magnetic sensor unit may be used on many different vehicles and adapted to high production techniques. In accordance with the present invention, the signal from the sensor unit 15 is transmitted by radio frequency signals to the logic and display panel 17. Display panel 17 includes a wheel indicator 37 showing the assigned number of the wheel being monitored. A high pressure warning light 38 or low pressure warning light 39 is turned on in response to the pressure monitor. A normal light 40 may be provided to indicate normal tire pressure.

Figure 2:
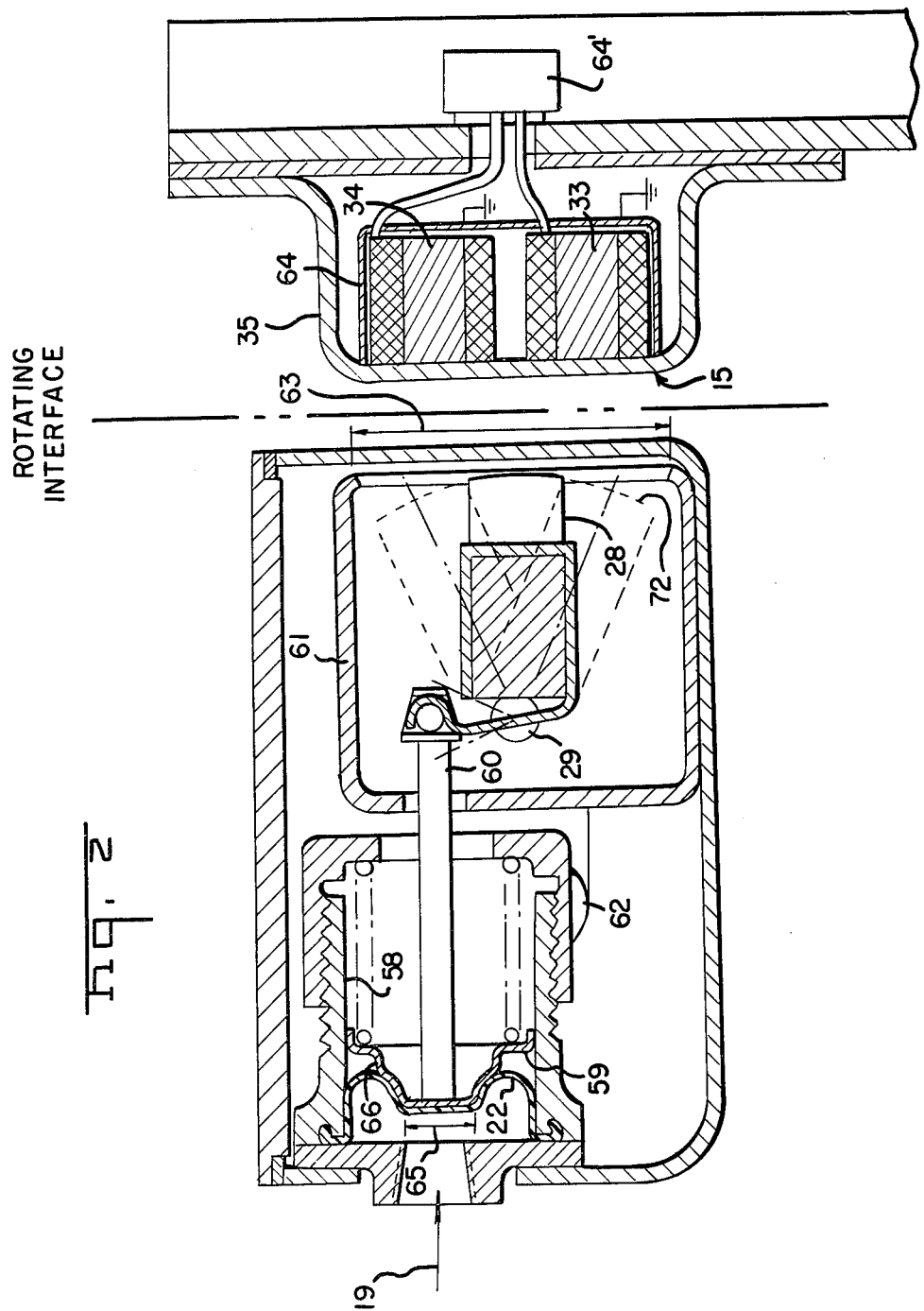
FIG. 2 is a sectional view of an embodiment of a magnetic generating unit utilizing a static shield and a two-diameter piston in the pressure sensor.

The pressure sensor shown in FIG. 2 uses a cylinder with a single internal diameter 58 in which a piston 59 operates in contact with a rolling diaphragm 22 that provides the desired dead band of operation in conjunction with the piston which is shaped to have two effective diameters. In this case, the piston 59 has a small diameter 65 which acts to yield a small effective diameter and area when the piston is moved toward the permanent magnet 28. Similarly, the large piston diameter 66 is effective on the diaphragm 22 when the piston is moved toward the pressure inlet yielding a larger effective diameter and area. This provides the dead band operation necessary to provide a range of satisfactory pressure which does not change the magnetic signal transmitted by the signal generating unit. Different pressures and ranges of pressure for different vehicles may be accommodated by changing the piston operating diameters slightly and by substitution of a modified spring as may be required. By this technique, all of the other basic components can be used on most conventional on-the-road vehicles.

The piston 59 operates the permanent magnet 28 by means of the piston rod 60 which operates through a hole in the static magnetic shield 61. This is the preferred embodiment of the magnetic shield since it remains fixed and may be visualized as a simple box with five closed sides and one open side or window 63. The window is located directly opposite the magnetic sensor on the nonrotating part of the vehicle. The shield is fabricated of steel or other ferromagnetic material which is impervious to a magnetic field whereby any material outside the five shielded sides of the permanent magnet can have no influence on the magnet or its field. The sixth or window side is in direct opposition to the magnetic sensor 15 at the time of sensing; the sensor is also protected by a ferromagnetic shield 64 on five sides from other magnetic materials or random magnetism. This provides the maximum possible shielding for the magnetic signal generator and magnetic sensor thereby minimizing inaccuracies and variation from one type vehicle to another.

The permanent magnet 28 is hinged on pivot 29 to operate from position 71 which corresponds to low tire pressure to position 72 which corresponds to high tire pressure. When the magnet is in the mid-position as shown by sold lines in FIG. 2, it projects an equal magnetic flux on the two coils 33 and 34 in the magnetic sensor. The coils generate an equal voltage which is interpreted by the logic as a satisfactory pressure. At this position of the magnet, the piston 59 of the actuator is within the "dead band" of the tire pressure. When tire pressure becomes too low, the piston moves toward the pressure source thereby rotating the magnet by means of the piston rod and the bracket on the magnet to position 71 where it is closer to coil 34 than to coil 33 causing a higher voltage to be generated in coil 34. The electronic logic compares the two signals, interprets this as a low pressure and displays a low pressure signal to the vehicle operator. When the tire pressure exceeds the dead band range, the piston moves the magnet to position 72 which is closer to coil 33 than to coil 34. This causes a higher voltage to be generated in coil 33 which is interpreted by the logic as a high pressure signal and displayed to the vehicle operator. The permanent magnet 28 is connected to a counterbalance 62 outside of the magnetic shield 61 to minimize the effects of centrifugal force on the operation of the pressure sensor and magnetic signal generating unit.

The signal from coils 33 and 34 is transmitted to the operator's position by a radio frequency transmitter 64' which will be subsequently described.

Figure 3:
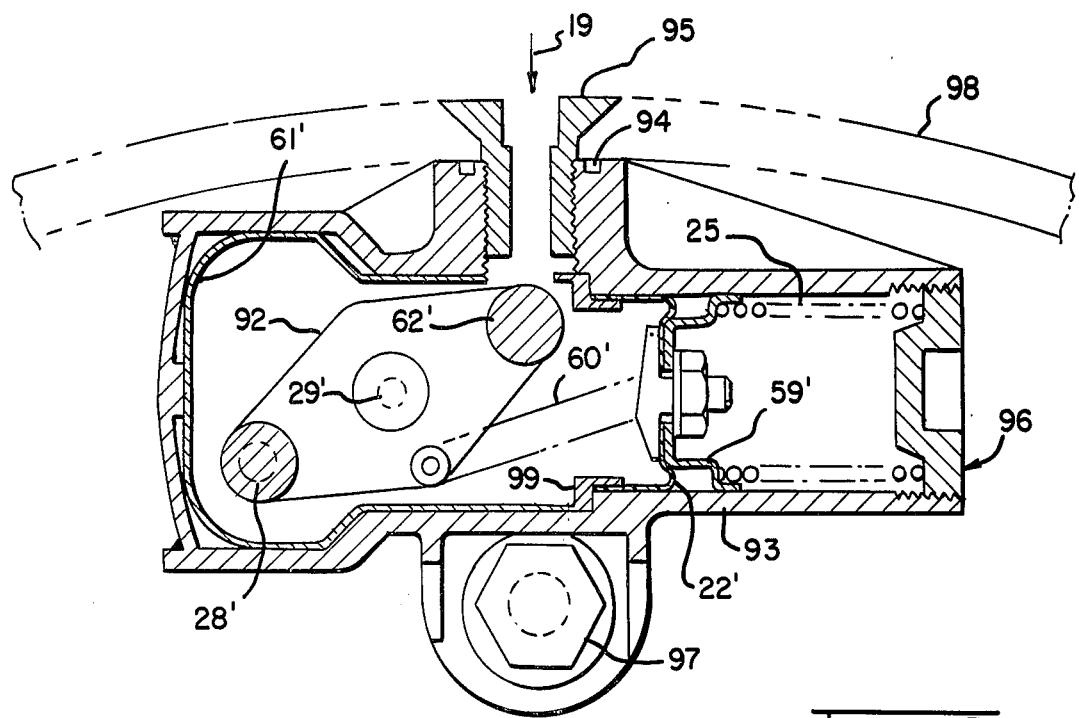
FIG. 3 is a sectional view of a similar signal unit having a single diameter piston.
Figure 4:
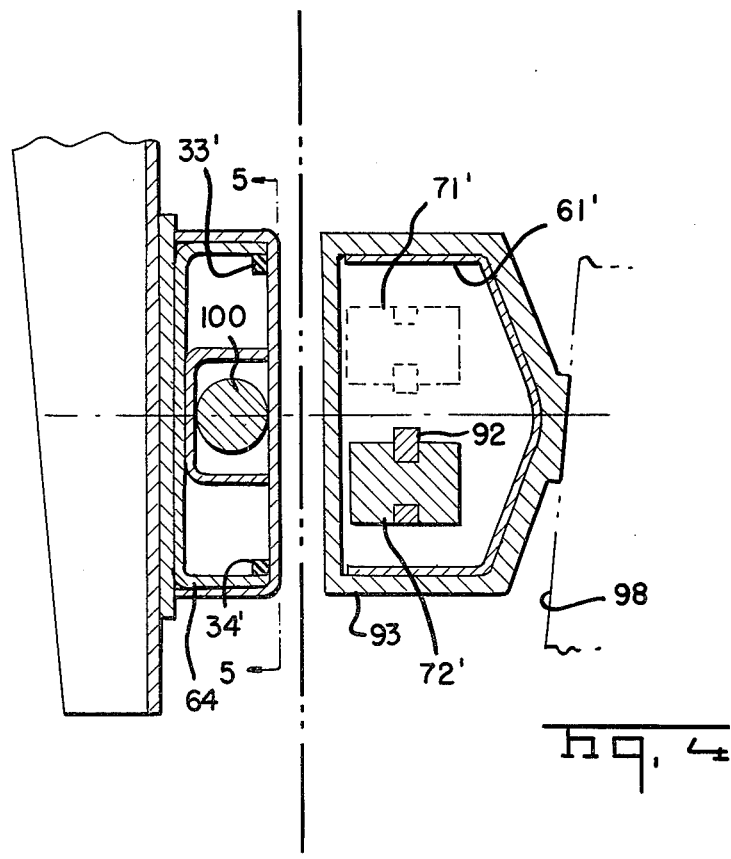
FIG. 4 is a view on the line 4—4 of FIG. 3.

A variation of the embodiment of FIG. 2 is shown in FIG. 3 and associated FIGS. 4 and 5. This embodiment is most suitable for passenger vehicles and also provides a means to eliminate the wiring on the chassis of the vehicle between the instrument panel display and the four wheel magnetic sensors. This wiring is a significant cost factor both in fabrication and installation of the hardware. Moreover, the severe environment under the body of the vehicle through which the wiring must pass imposes a reliability and maintenance penalty which may be avoided by use of a wireless signal relay.

FIG. 3 is a view looking outboard at the plane of wheel 98. Air pressure 19 from the pressurized cavity enters the unit through the hollow screw 95 which also serves as the primary attachment of the wheel unit. The "O" ring or similar seal 94 serves as the only seal required between the wheel and the unit. The secondary attachment bolt 97 is provided for stability and security in the severe dynamic environment on the wheel. The hole through the wheel rim may be avoided by use of a pressure connection incorporated in the valve stem as shown in FIG. 1. The case 93 also serves as the cylinder for the pressure sensing unit. The rolling diaphragm 22' is shown with a single diameter piston 59' although a dual diameter piston as in FIG. 2 may be used with equivalent advantages of sensing both high and low abnormal pressures. The compression spring 25' is adjusted by means of the cylinder cap 96 to accommodate tolerances in spring forces and length. The diaphragm 22' is secured by the retainer 99 which in turn is held in place by the shield 61'. An end cap is provided to retain the shield and is sealed to complete the pressure cavity within the wheel unit. FIG. 3 shows the magnet 28' in the normal pressure position. When air pressure falls below the preset minimum, the piston is moved to the left by the spring force causing rocker arm 92 to rotate clockwise about its pivot 29' and move magnet 28' farther away from the wheel axle. The weight of the magnet is counterbalanced by weight 62' to avoid unbalancing centrifugal forces.

Figure 8:
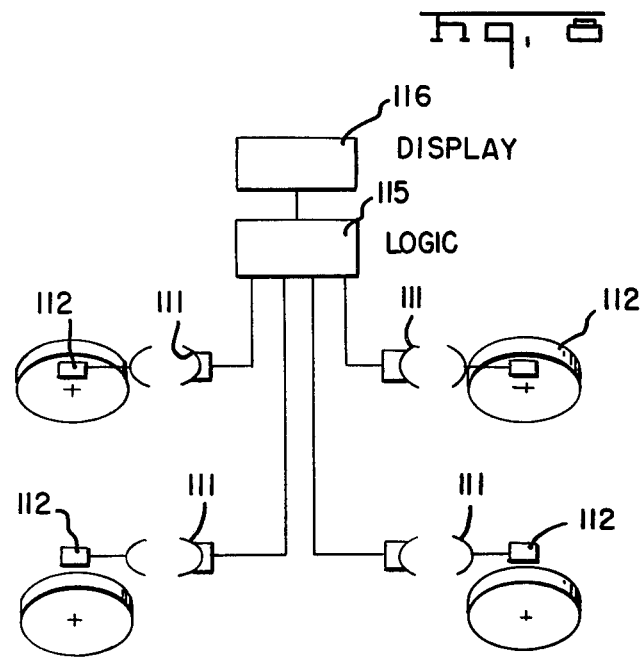
FIG. 8 shows transmitters for four wheels transmitting to four different receivers.
Figure 9:
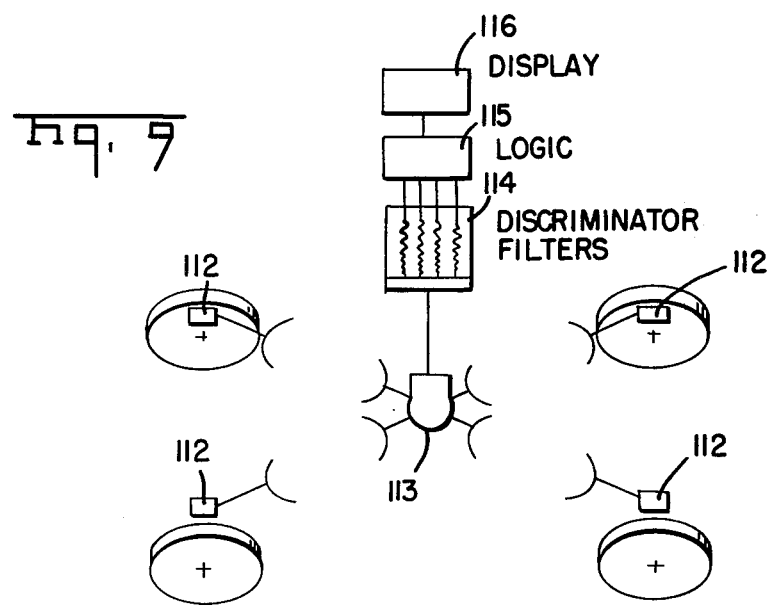
FIG. 9 shows the transmitters from four wheels transmitting to a single receiver.
Figure 11:
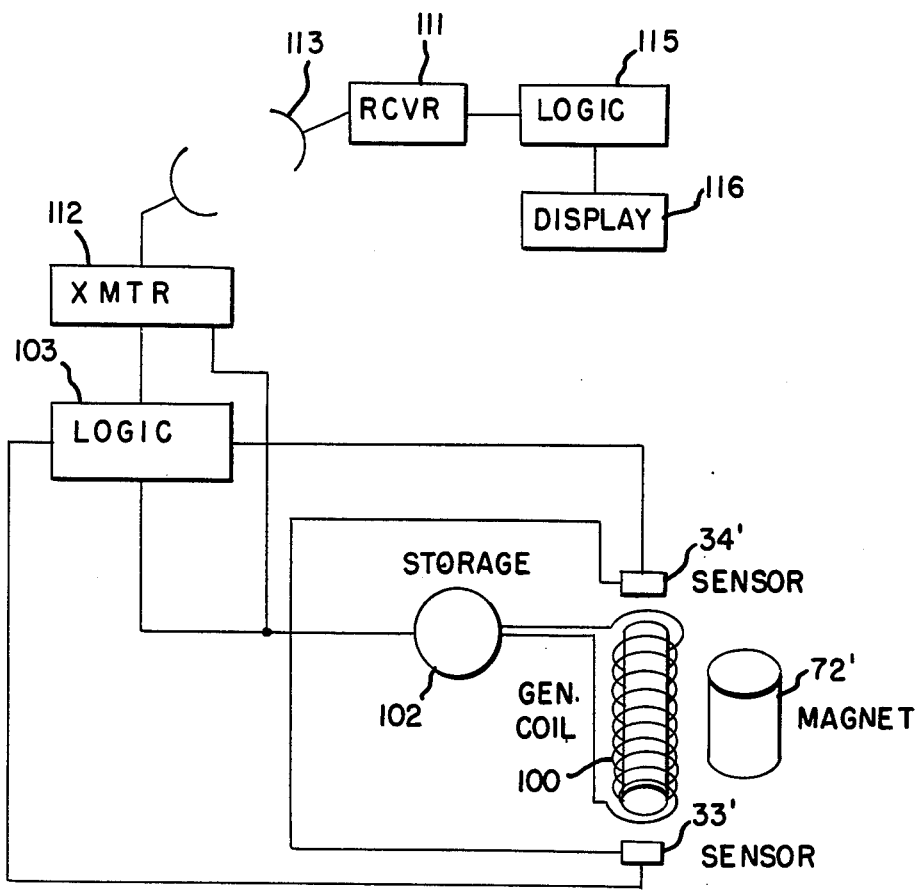
FIG. 11 is an electrical block diagram.

FIG. 4 is a view taken at 4—4 through the wheel unit and matching magnetic sensor unit on the chassis. Magnet 72' is the normal pressure position and dotted outline 71' is the low pressure position of the magnet. Two magnetic sensors 33' and 34' are located respectively in proximity to the low pressure position 71' and the normal pressure position 72' of the magnet. The sensors may be a coil as shown in FIG. 2, a Hall Effect Device or any sensor, preferably solid state, which provides an output dependent on the strngth of a magnetic field through which it is passing. These sensors are isolated by shield 64' from external electromagnetic influences but case 104 of nonferrous materials allows passage of the magnetic field. The output of the sensors, rather than being transferred by interconnecting wires to the instrument panel display unit, is relayed by a wireless unit integral with the sensor unit. To provide electrical power for operation of the wireless unit, an electromagnetic coil 100 is provided within the same case. This coil is swept by the field of the permanent magnet in the wheel unit when it is in either the low pressure position 71' or the normal pressure position 72' or any position therebetween. Coil 100 is separated from sensors 33' and 34' by a ferrous shield 101 to prevent electromagnetic interference. The charge generated within the coil is stored momentarily in capacitor 102 and released at a controlled rate to power the electronics and transmit the appropriate signal. The signal transmitted may be a short signal (dot) for normal pressure and a longer signal (dash) for low pressure. In an alternate mode, the transmitted signal may be different for each wheel in order to simplify identification of the wheel by the instrument panel receiver and logic unit. Another mode of identifying the wheel from which a signal is being received is depicted in FIG. 8 wherein receiving antenna 111 is located in each wheel well of the vehicle in close proximity to the transmitting unit 112. A further means of identifying each wheel's signal is shown in FIG. 9 to provide directional receiving antennas 113 in a common location under the vehicle body with each antenna oriented toward a corresponding wheel transmitting unit 112. These provide separate signals to logic unit 115 and display unit 116. A still further means of identifying the specific wheel is to transmit on a different frequency for each wheel and provide a corresponding filter 114 in the receiver circuits to read out the appropriate wheel on the display unit. In order to discriminate between vehicles in close proximity and having the same type tire sensor system, means may be provided so that the strongest signal (nearest, i.e., on that vehicle) will be locked on by the receiver unit.

The receiver unit includes at least one antenna and the necessary electronics to interpret the normal pressure, low pressure and high pressure signals and to discriminate among the signals to identify each wheel or tire. In a simplified system, the high pressure signals and/or the wheel discrimination may be eliminated in order to reduce complexity and cost. Such a simplified system may be suitable for passenger vehicles having only four tires but less appropriate for trucks having eighteen or more tires. In all embodiments, the electronic logic interprets the wheel unit signals and provides the appropriate indications to the driver via the display unit on the instrument panel.

Another embodiment of the wireless configuration makes use of the principle of the generating coil in providing the electrical current necessary to power the sensor and/or send the output signal to the logic unit without interconnecting wires. This principle of generating an electromotive potential by means of a permanent magnet and a corresponding coil on two parts of a mechanism having relative motion therebetween may be used on any apparatus to power a sensor and to send the output signals without wires to a remote (noncontiguous) receiver where an antenna, electronic logic and an appropriate display will provide the desired information to the operator or a recorder. Linear motion, reciprocating motion as with a piston in a cylinder, circular or rotating motion and all combinations thereof may be monitored for the status of parameters thereon.

This principle may also be used on a tire pressure monitor as shown in FIG. 6 by reversing the location of permanent magnet 28" to be attached in a fixed location by bracket 16' on the vehicle chassis. As the vehicle 98 rotates past magnet 28", generating coil 100 passes through the field of the magnet whereby an electromotive force is generated in the coil. As in the embodiment of FIGS. 3-5, the current is stored momentarily in capacitor 102 and released at a controlled rate to power the sensor and relay electronics. In this embodiment, it is more advantageous to employ a simple pressure switch 105, rather than a cylinder, piston and diaphragm. A piezoelectric crystal or other solid state device is preferable because of the severe centrifugal and shock forces imposed by the environment on the wheel. As noted hereinbefore, the electronics sends the output signal via wireless to the receiver unit either adjacent to the wheel or at a central location on the vehicle. Both abnormal high pressure and abnormal low pressure may be sensed by the use of two switches or a two stage switch. A continuous output of pressure reading may be provided by utilization of a pressure switch having a continuous change in signal with pressure variation.

When a nonferrous wheel 110 (e.g., aluminum) is used on the vehicle, the sensing unit may be located entirely within the pressurized cavity and the additional hole through the rim can be eliminated as shown in the embodiment of FIG. 7. This approach has value in reducing the possibility of air leaks and in protecting the wheel unit from the severe environment external to the pressurized cavity. A nonferrous cover 109 is provided over the electronics to prevent damage during tire installation. The RF signals can be sent directly through the sidewalls or tread of any tire wherein steel construction is not employed.

Similarly, for steel wheels, the generating coil may be external to the pressurized cavity as shown in FIG. 10 and may be connected to the pressure sensor and electronics by wires 106 molded into the valve stem assembly 107 and passing through the same hole in the wheel rim. Connectors 108 are provided to disconnect the wires when the valve stem is removed.

Figure 12:
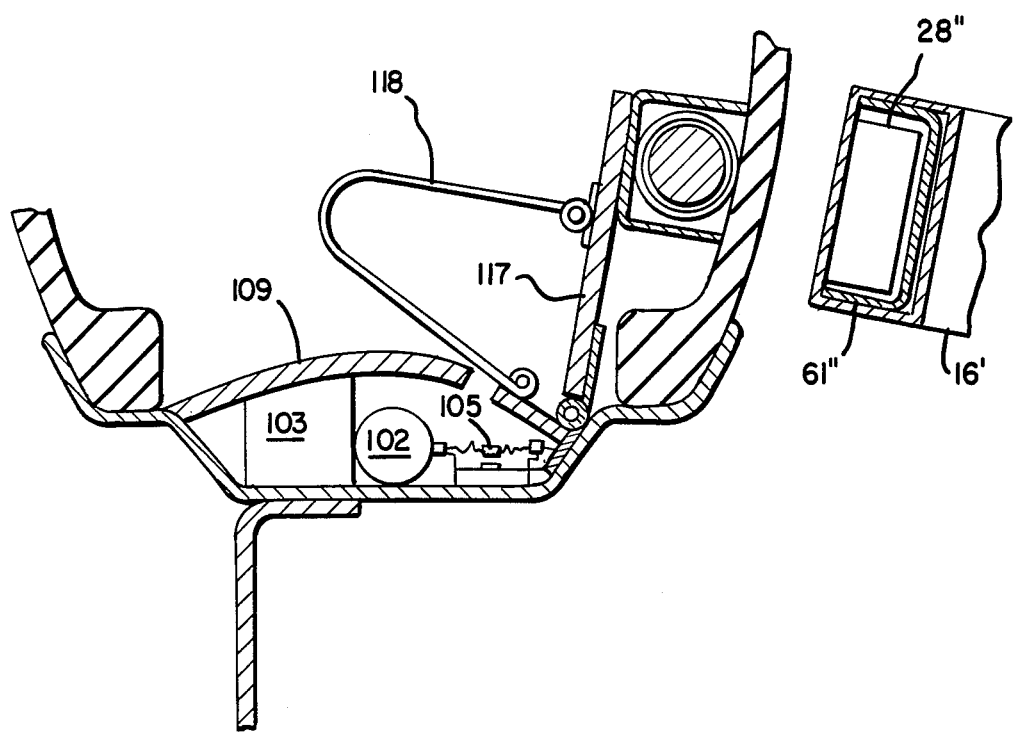
FIG. 12 shows an embodiment in which the electromagnetic generating coil is located adjacent to the inside of the tire sidewall.

Another means of avoiding the problem of a steel wheel is shown in FIG. 12 wherein the fixed permanent magnet is located in close proximity to the tire sidewall and the generating coil internally in opposition thereto. In this embodiment, the generating coil is located on flexible structure 117 to facilitate tire installation. The apparatus is biased by spring 118 to locate the coil in close proximity to the tire sidewall and the fixed magnet is located in close opposition to the exterior of the tire. Although the above description is provided for a tire pressure sensor on a vehicle wheel, other parameters may be sensed on any apparatus on which relative motion between two parts can be accurately determined.

What is claim is:

1. An automatic vehicle tire pressure monitoring system comprising:
    a pressure sensitive actuator mounted on the wheel of said vehicle;
    means for generating a magnetic field mounted on said wheel and adjustable by said pressure sensitive actuator when the pressure in said vehicle tire changes;
    an electromagnetic coil located on the chassis of said vehicle so that an electromagnetic potential is generated within the coil by said magnetic field;
    a transmitter connected to said electromagnetic coil, said transmitter receiving its power from said electromagnetic coil; and
    magnetic field sensors on the chassis of said vehicle, said sensors being responsive to said magnetic field and connected to said transmitter so that said transmitter transmits signals representing tire pressure.

2. The apparatus recited in claim 1 wherein said transmitter transmits radio frequency signals.

3. The apparatus recited in claim 1 further comprising an electrical storage device, said electromagnetic potential being applied to said storage device which is connected to supply power to said transmitter as needed.

4. The apparatus recited in claim 1 wherein said electromagnetic potential is applied to said sensors to power them.

5. The apparatus recited in claim 4 wherein said magnetic sensors are Hall Effect Devices.

6. The apparatus recited in claim 1 wherein said vehicle has an operator's location, said apparatus further comprising a receiver in the operator's location of said vehicle for receiving the transmitted signals and indicating tire pressure in response thereto.

7. The apparatus recited in claim 6 further comprising a receiver for each wheel of said vehicle and an indicator of tire pressure for each receiver.

8. The apparatus recited in claim 6 wherein said receiver receives signals from transmitters in proximity to each wheel of said vehicle, said receiver including a discriminator for determining and displaying the identity of the tire being monitored.

9. The apparatus recited in claim 8 further comprising a filter connected in said discriminator to prevent detection of spurious signals.

10. An automatic vehicle tire pressure monitoring system comprising:
    a tire pressure sensor;
    a radio frequency transmitter, said tire pressure sensor being connected to said transmitter;
    an electromagnetic potential generating means including a permanent magnet and an electromagnetic coil, one being mounted on the wheel of said vehicle, and the other being fixed to the chassis of said vehicle at locations spaced from the axis of rotation of said wheel so that said generating means is energized by the rotation of the vehicle wheel, said generating means being connected to said transmitter to supply power thereto.

11. The apparatus recited in claim 10 wherein said tire pressure sensor and said transmitter are mounted on the wheel of said vehicle.

12. The apparatus recited in claim 10 wherein said electromagnetic coil is mounted on the wheel of said vehicle and wherein said magnet is on the chassis of said vehicle.

13. The apparatus recited in claim 10 wherein said pressure sensor, radio frequency transmitter and generating means are within the cavity of the tire of said vehicle.

14. The apparatus recited in claim 10 wherein said tire pressure sensor and transmitter are inside the tire casing and wherein said electromagnetic generating means is outside of the tire casing and connected through the tire valve-stem to said transmitter.

* * * * *

UNITED STATES PATENT AND TRADEMARK OFFICE
CERTIFICATE OF CORRECTION

PATENT NO. : 4,163,208
DATED : July 31, 1979
INVENTOR(S) : Ernest J. Merz

It is certified that error appears in the above—identified patent and that said Letters Patent is hereby corrected as shown below:

Column 1, line 59, after "prior art" delete "Streglein" and insert therefor -- Strenglein --;

Column 9, line 3, after "is", delete "claim" and inser therefor -- claimed --.

Signed and Sealed this

Eighth Day of January 1980

[SEAL]

Attest:

SIDNEY A. DIAMOND

Attesting Officer

Commissioner of Patents and Trademarks